United States Patent [19]

Chang

[11] Patent Number: 4,907,828

[45] Date of Patent: Mar. 13, 1990

[54] ALIGNABLE, THREADED, SEALED CONNECTION

[75] Inventor: Michael C. Chang, Houston, Tex.

[73] Assignee: Western Atlas International, Inc., Houston, Tex.

[21] Appl. No.: 156,206

[22] Filed: Feb. 16, 1988

[51] Int. Cl.⁴ .............................................. F16L 35/00
[52] U.S. Cl. ...................................... 285/24; 285/184; 285/351; 285/355; 285/404
[58] Field of Search .................... 285/355, 390, 31, 32, 285/19, 24, 184, 351, 404

[56] References Cited

U.S. PATENT DOCUMENTS

| | | | |
|---|---|---|---|
| 675,320 | 5/1901 | Boyne | 285/32 |
| 2,094,416 | 9/1937 | Sheffield | 285/355 X |
| 2,914,332 | 11/1959 | Cervini | 285/404 X |
| 2,932,305 | 4/1960 | Kirche | 285/32 X |
| 3,392,746 | 7/1968 | Young | 285/32 X |
| 3,461,877 | 8/1969 | Morch | 285/32 X |

Primary Examiner—Dave W. Arola
Attorney, Agent, or Firm—Browning, Bushman, Zamecki & Anderson

[57] ABSTRACT

The present invention is directed to an apparatus and method for assembling, aligning and securing a sealed connection. The apparatus and method of the present invention advantageously employ the mechanical leverage of a threaded connection, preferably square threads, to overcome the high O-ring seal friction associated with large diameter, high pressure O-ring seals. The disadvantages of threads are eliminated by the use of thread relief grooves adjacent and interior to the threads. The thread relief grooves must be of sufficient length and annular dimensions to accommodate the disengaged upset threads therein to permit free rotation. The combined length of threaded engagement must be sufficient to move the O-ring seal into sealing engagement to fully achieve the advantageous ease of assembly of the present invention. Further, this connection is unlikely to separate during use in that disengagement of the threads into the thread relief grooves prevents back off where high make up torque is not employed. After makeup of the O-ring seal, continued rotation results in disengagement of the threads into the thread relief grooves where alignment in any desired orientation is easily achieved by continued rotation. Once aligned in the desired orientation the connectors are secured by screws.

11 Claims, 2 Drawing Sheets

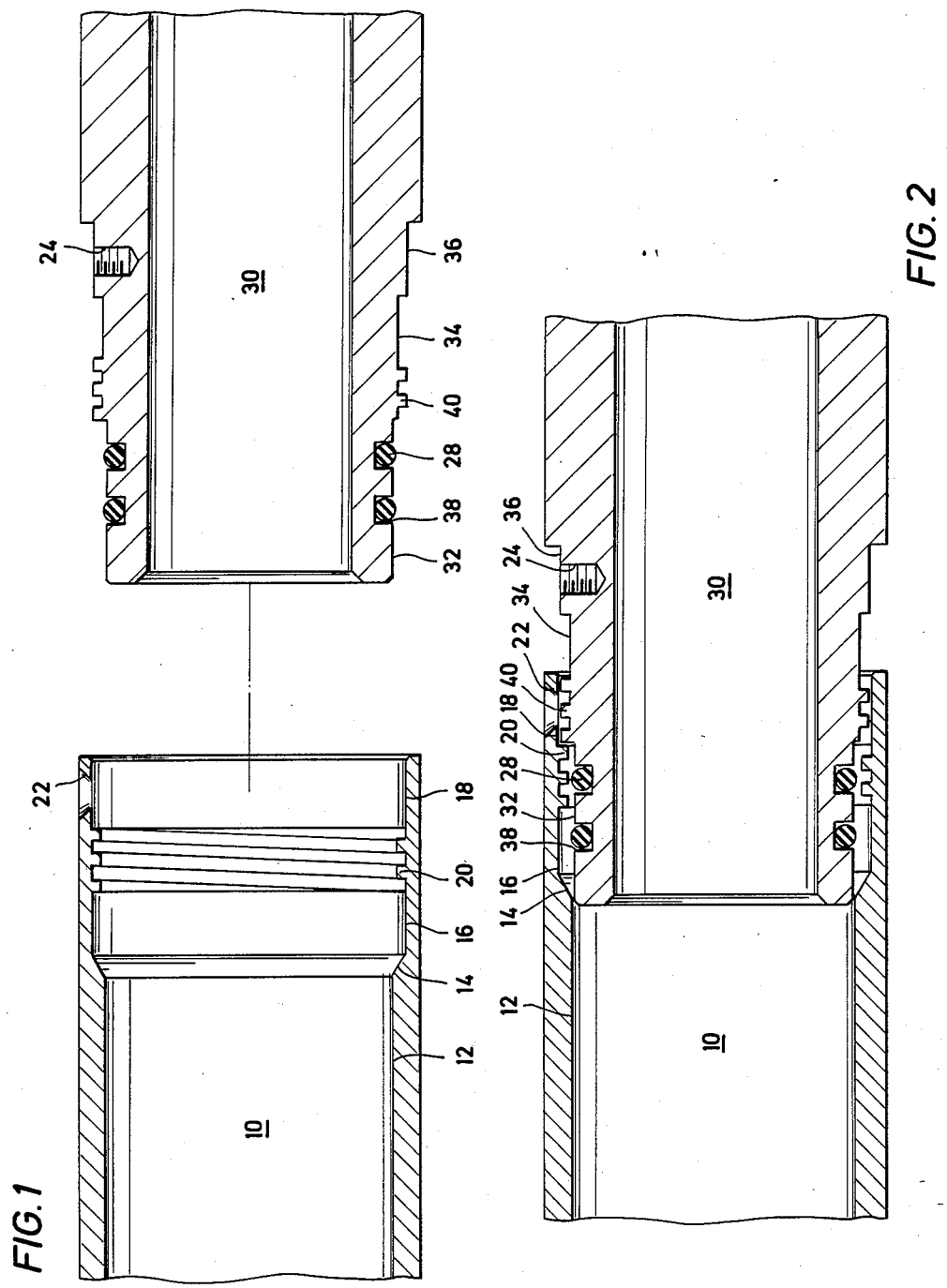

ALIGNABLE, THREADED, SEALED CONNECTION

BACKGROUND OF THE INVENTION

1. Field of the Invention

The present invention generally relates to an apparatus and method for providing an alignable, threaded sealed connection. The present invention is particularly useful in providing such a connection between two tubular members. More specifically, the present invention relates to an apparatus and method wherein a high pressure O-ring seal between mating male and female connectors is brought into sealing engagement with the aid of thrust transmitting threads which then disengage into interior thread relief grooves to permit relative rotation of the connectors for aligning and securing the connectors in a desired orientation.

2. Description of the Background

Seals which must withstand high pressure are employed in many environments. Many applications of high pressure seals are employed in the oil and gas drilling industry. For example, high pressure seals are used in the assembly of tubular devices intended for passage through boreholes in the logging of oil and gas wells. These devices typically employ a plurality of elastomeric, O-ring seals disposed in annular grooves about a male connector inserted within a cooperating female connector. These seals are used to protect the sensitive instruments, including the sensors and electronics, disposed within the logging tools from the harsh environment of the downhole location, including high pressure, high temperature and abrasive drilling fluids.

Because these large diameter, high pressure seals result in higher O-ring friction during assembly, a high assembly force is required. In the past, connections with those seals were simply assembled by forcing the connectors together and using brute force to overcome the high O-ring friction associated with the high pressure, large diameter seals. Although the mechanical advantages of threads in overcoming the O-ring friction was known, threads were not often used. Several reason exist for not employing a threaded make up. Where threads were employed to overcome the O-ring friction, it was not possible to align the connection as may be required after makeup. Accordingly, where an alignable connection was required, the advantages of a threaded makeup were unavailable. Further, threaded connections presented the risk that the threads might back off during use, causing separation of the connection and the possibility that a portion of the tool might be lost in the borehole.

Accordingly, there has been a long felt but unfulfilled need by the users of sealed connections, and particularly users in the oil and gas well logging industry where large diameter, high pressure seals are common, for an easily made up connection with the advantages, but not the disadvantages, associated with threaded makeup with the capability of aligning the connection to a desired orientation.

SUMMARY OF THE INVENTION

The present invention provides a new and improved apparatus and method for making up a high pressure, sealed connection. The disclosed apparatus and method utilize threaded makeup to overcome the extremely high O-ring friction associated with a large diameter, high pressure seal. However, after makeup, the present apparatus and method permit the threads to be disengaged into interior thread relief grooves to both prevent back-off and permit relative rotation of the connectors to achieve any desired orientation of the connectors. After the desired orientation is achieved the connectors are secured by any conventional means, including radial screws.

An apparatus in accord with the present invention includes a male connector and a female connector. The female connector includes a bore therein with upset female threads extending axially along the bore a first distance and a thread relief groove adjacent and interior thereof and extending axially along the bore a second distance. The male connector includes a cylindrical plug for mating with the female bore, the plug including upset male threads for engaging the female threads and an adjacent and interior thread relief groove both extending axially along the plug. The upset male threads extend not more than the second distance while the thread relief groove extends at least the first distance. Further, the thread relief groove on the female connector is of a sufficiently large diameter and the thread relief groove on the male connector of a sufficiently small diameter to accommodate therein the upset male and female threads, respectively, to permit relative rotation of the male and female connectors when the threads are aligned with their cooperating thread relief grooves.

The female bore and male plug further include mating sealing surfaces with an elastomeric seal means disposed therebetween. In the presently preferred embodiment the seal means comprises an O-ring seal disposed in an annular groove about the end of the male plug for cooperation with a seal bore disposed interiorly of the thread relief groove in the female connector. This configuration advantageously aids alignment of the male and female connectors prior to engagement of the upset threads and protects the O-ring seal during assembly.

Finally, the apparatus includes means for aligning the connectors and means for securing the aligned connectors. In the presently preferred embodiment, a plurality of asymmetrically disposed radial screws placed through countersunk holes near the end of the female connector and threaded into a plurality of tapped bores asymmetrically disposed about the interior end of the male connector provide both the means for aligning and means for securing the connectors.

The method of the present invention comprises threading together male and female connectors with engaging upset threads disposed on each in order to bring a seal means disposed on a seal surface of one connector into sealing engagement with a seal surface on the other connector. The method further includes threading the engaged connectors until the upset threads disengage into adjacent thread relief grooves configured to permit the connectors to rotate relative to one another. Finally, the method comprises rotating the connectors relative to one another to bring them into a desired orientation and securing the connectors together in that desired orientation. The method of the present invention may be advantageously employed with any of the connector pairs disclosed herein.

The device and method of the present invention solves the long felt but unfulfilled need for a high pressure connector employing threaded engagement to overcome the high O-ring seal friction associated with large diameter, high pressure seals together with disengagement of the threads into interior thread relief grooves to permit relative rotation of the connectors to achieve a desired orientation for securing the connectors together. Another advantage of this configuration is that it prevents back-off of the threaded connections and separation of the connectors where high make up torque is not desirable. These and other meritorious features and advantages of the present invention will be more readily appreciated from the following detailed description and claims.

BRIEF DESCRIPTION OF THE DRAWINGS

Other features and intended advantages of the present invention will be more readily apparent by the references to the following detailed description in connection with the accompanying drawings, wherein:

FIG. 1 is an axial cross-sectional illustration of a female connector and a male connector in accord with the present invention;

FIG. 2 is an axial cross-sectional illustration of a male and female connector in accord with the present invention just prior to engagement of the upset threads;

Figure 3:
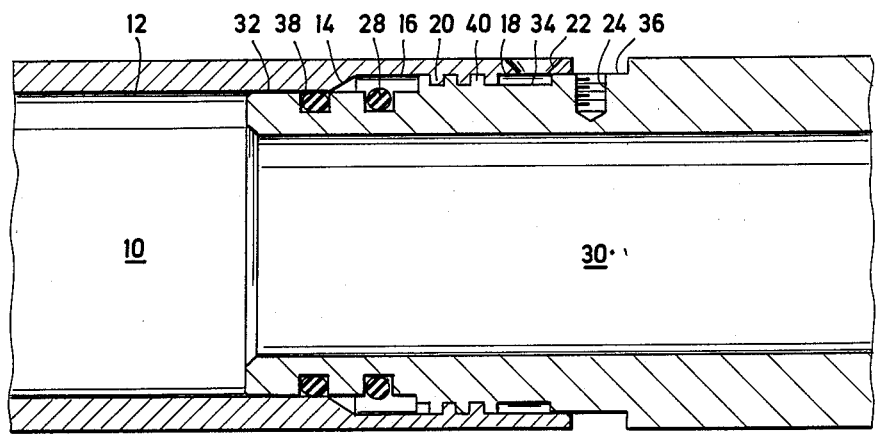
FIG. 3 is an axial cross-sectional illustration of a male and female connector in accord with the present invention with the upset threads fully engaged and the first of two O-ring seals made up.

While the invention will be described in connection with the presently preferred embodiment, it will be understood that it is not intended to limit the invention to this embodiment. On the contrary, it is intended to cover all alternatives, modifications and equivalents as may be included in the spirit of the invention as defined in the appended claims.

DETAILED DESCRIPTION OF THE PREFERRED EMBODIMENT

FIGS. 1-5 of the drawings illustrate a presently preferred embodiment of an alignable, threaded, sealed connection particularly useful in the high pressure environment encountered by downhole tools used in logging boreholes in the oil and gas drilling industry. The illustrated device is readily assembled and disassembled. Advantageous use of a threaded connection to overcome the high friction of a high pressure O-ring seal is employed. However, the disadvantages of threaded connections, i.e. the inability to readily orient the connectors and the tendency of threaded connections to lack off, are eliminated by the inclusion of thread relief grooves interior of the threads. Thus, as the seal is made up the threads are disengaged into the thread relief grooves by continued turning to facilitate unhindered relative rotation of the connectors to any desired orientation where they are secured by conventional means, e.g., radial screws, pins or the like. In fact, use of a plurality of asymmertrically distributed radial screws provides a convenient means to both orient and secure the connectors.

The invention will now be described in connection with the presently most preferred embodiment as illustrated in FIGS. 1-5. In the presently most preferred embodiment a female connector comprises tubular connector 10 having a central bore therein. Beginning from the exterior, the central bore includes securing bore 18 and upset female threads 20. Adjacent and interior of threads 20 is thread relief groove 16 tapering at 14 to sealing bore 12. Disposed asymmetrically about securing bore 18 are a plurality of countersunk holes 22.

The male connector 30 also comprises a tubular member with a cylindrical plug configured for mating engagement with the central bore of female tubular connector 10. Beginning on its end, male connector 30 comprises aligning and sealing plug 32 for aiding initial alignment of connectors 10, 30 and for mating within sealing bore 12 of female connector 10. Disposed in a plurality of annular grooves 38 about sealing plug 32 are a plurality of elastomeric O-ring seals 28. Next are upset male threads 40 with a second thread relief groove 34 disposed adjacent and interior thereof. Finally, male connector 30 includes securing plug 36 configured to mate within securing bore 18. Disposed about plug 36 are a plurality of asymmetrically distributed radial bores 24 for cooperation with countersunk holes 22 in female connector 10. Bores 24 are tapped for receiving machine screws 26 for securely engaging male connector 30 within female connector 10 when fully assembled and aligned.

Threads 20, 40 are straight threads cut for cooperating engagement. Preferably, threads 20, 40 are square threads for improved thrust transmission useful in overcoming the high O-ring seal friction encountered in assembling connectors 10, 30. Thread relief grooves 16, 34 also must be straight and of sufficient length and depth to accommodate therein, respectively, threads 40, 20. Accordingly, thread relief groove 16 must be at least as long as threads 40 and with a diameter at least as great as the diameter of the ridges of threads 40. Similarly, thread relief groove 34 must be at least as long as threads 20 and with a diameter not greater than the diameter of the ridges of threads 20.

Figure 4:
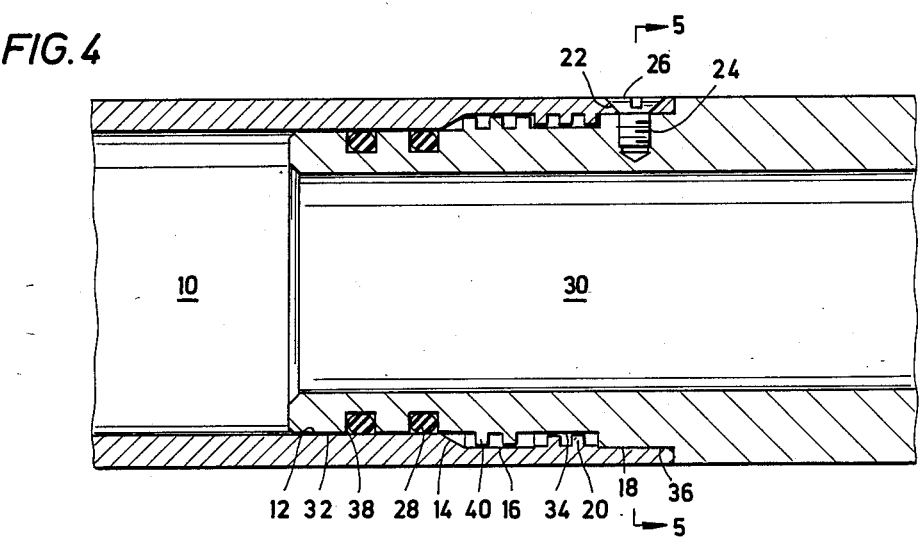
FIG. 4 is an axial cross-sectional illustration of a male and female connector in accord with the present invention fully assembled, illustrating both O-ring seals made up, the upset threads disengaged and disposed in their cooperating thread relief grooves and the connectors secured with a radial screw.
Figure 5:
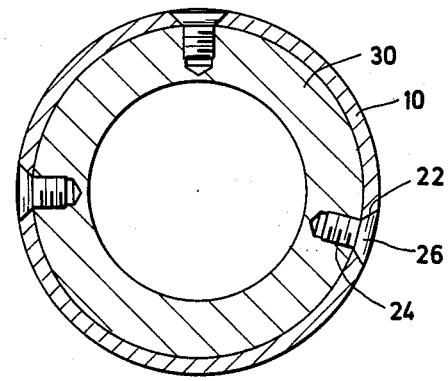
FIG. 5 is a radial cross-sectional illustration of a made up connector in accord with the present invention through 5—5 of FIG. 4 illustrating the asymmetrically disposed radial screws used for aligning and securing the male and female connectors.

In the presently most preferred embodiment illustrated in FIG. 1, the diameters of sealing bore 10 and O-ring seals 28 are less than the diameter of the ridges of female threads 20 to permit O-ring seals 28 to pass unhindered through threads 20. This presently most preferred configuration aides in aligning the connectors and ensuring make up of female threads 20 with male threads 40 as illustrated in FIG. 2. Relative rotation of connectors 10, 30 engage square threads 20, 40 to pull connectors 10, 30 together. Although square threads are desirable for transmitting thrust and minimizing the force required to make up the connection, any appropriate thread design may be employed. FIG. 3 illustrates the assembly partially made up where threads 20, 40 are fully engaged and a first O-ring seal 28 has been brought into sealing engagement with sealing bore 12. Further rotation continues to pull together connectors 10, 30 until both O-ring seals 28 have been brought into sealing engagement with sealing bore 12 and threads 20, 40 have disengaged into their respective thread relief grooves 34, 16. In this configuration, connectors 10, 30 may be freely rotated relative to one another to any desired orientation. Once brought into the desired orientation, connectors 10, 30 are secured by conventional securing means, e.g., screws 26 as illustrated in FIG. 4. In the presently preferred embodiment a plurality of asymmetrically disposed radial bores 24 in male connector 30 and cooperating countersunk holes 22 in female connector 10 are employed to aid alignment by indicating the desired orientation. Relative rotation of connectors 10,30 to bring bores 24 into alignment with holes 22 automatically aligns connectors 10,30. Finally, a plurality of screws 26 are employed to secure together the properly oriented connectors 10, 30.

The presently preferred embodiment as illustrated in FIGS. 1-5 provides a seal interior of the threads as illustrated in FIG. 4. In order to provide this interior seal the diameters of sealing bore 12, plug 32 and O-rings 28 must be less than the diameter of the ridges of female threads 20. This configuration is particularly advantageous in that plug 32 extending through the bore in female connector 10 and into bore 12 aids alignment of threads 20, 40. Accordingly, misalignment, resulting in improper sealing and/or damaged threads is minimized. Another advantage is that O-ring seals 28 are protected from burrs which may be present on countersunk holes 22. However, an even greater advantage is the fact that the seal is interior of the minimum wall thickness of the connectors, i.e., the thread relief grooves, and, thus, protects the minimum wall thickness from the pressure differential between the exterior and interior of the connection. In an alternative embodiment a seal exterior of threads 20, 40 may be desirable, although protection of the thread relief grooves from the pressure differential would be lost. In these instances, bore 18 and plug 36 are merely lengthened as required to accommodate placement of annular grooves 38 with O-ring seals 28 between threads 20, 40 and bores 22, 24, respectively. In such a configuration the diameter of O-ring seals 28 and cooperating sealing surfaces 36, 18 are greater than the diameter of the ridges of threads 40 since in this configuration the O-rings need not pass through threads 20.

The method of the present invention comprises inserting male connector 30 into female connector 10 until threads 20, 40 abut as illustrated in FIG. 2. In this position, O-ring seals 28 have passed through threads 20 but do not contact sealing bore 12. Accordingly, no O-ring seal friction has been encountered. Threads 20, 40 are made up by relative rotation of connectors 10, 30. During relative rotation O-ring seals 28 are brought into contact with sealing bore 12. The O-ring friction is overcome by the mechanical advantage of threads 20, 40. See FIG. 3. Continued rotation makes up seals 28, 40 after which threads 20, 40 disengage into thread relief grooves 34, 16, respectively, as illustrated in FIG. 4. At this point, O-ring seals 28 are properly seated against seal bore 12. In order to ensure that O-ring seals 28 are fully seated, the combined thread length of threads 20, 40 must be greater than the distance required to move seals 28 into sealing engagement from the point at which the threads first meet. Seals 28 should first contact seal bore 12 after threads 28, 40 have engaged. After this engagement, the remaining axial length of thread engagement of threads 20, 40 must be greater than the axial width of seals 28. After threads 20, 40 have completely disengaged within their respective thread relief grooves 34, 16, continued relative rotation of connectors 10, 30 brings them into any desired orientation. Once brought into the desired orientation, connectors 10, 30 are secured together by conventional means as earlier described.

Disassembling is easily achieved by removing screws 26 and relatively rotating connectors 10, 30 in the opposite direction while pulling them apart. This movement reengages threads 20, 40 to again employ the mechanical advantage of the square threads to overcome the O-ring friction during disassembly.

The foregoing description of the invention has been directed in primary part to a particular preferred embodiment and method in accordance with the requirements of the patent statutes and for purposes of explanation and illustration. It will be apparent, however, to those skilled in the art that many modifications and changes in this specifically described apparatus and method may be made without departing from the scope and spirit of the invention. For example, an alternate placement of O-ring seals 28 exterior of threads 20, 40 has been described. Further, although bore 12 and plug 32 have been shown with straight sides, they alternatively may be tapered. Still further, although O-ring seals 28 are preferably disposed in grooves 38 in male connector 30, they alternatively may be disposed in grooves in female connector 10. Therefore, the invention is not restricted to the particular form of construction and method illustrated and described, but covers all modifications which may fall within the scope of the following claims.

It is applicant's intention in the following claims to cover such modifications and variations as fall within the true spirit and scope of the invention.

What is claimed is:

1. An alignable, threaded, sealed connection for connecting a pair of tubular members in a high-pressure borehole environment, comprising:

a female connector section disposed adjacent one end of the tubular members and having an increased diameter upset bore disposed therein communicating with the end of the tubular member and with a smaller interior bore of the tubular member across an upset shoulder disposed therein, said female connector section further including first upset threads spaced axially from said upset shoulder and disposed axially along said upset bore a first interval, and a first thread relief groove spaced interiorly thereof between said first upset thread and said upset shoulder;

a male connector section disposed adjacent one end of the other of the tubular members and including a reduced diameter upset cylindrical plug with a first cylindrical portion adjacent said plug end having a first reduced diameter for mating with the interior bore of said one tubular member carrying said female connector section and a second cylindrical portion intermediate said first cylindrical portion and said other tubular member body having a second reduced diameter for mating with the interior of said upset bore disposed in said female connector section, said male connector section further including second upset threads disposed on said second cylindrical portion and axially spaced from said plug end and axially disposed thereon a second interval for engaging said first upset threads of said female connector section, and a second thread relief groove spaced interiorly thereof between said second upset threads and the tubular member body;

said first thread relief groove extending axially for at least said second interval and having a diameter sufficiently large to accommodate said second upset threads;

said second thread relief groove extending axially for at least said first interval and having a diameter sufficiently small to accommodate said first upset threads;

a first sealing surface comprising the bore through said female connector section and the one tubular member;

a second sealing surface comprising the surface of said cylindrical plug end;

elastomeric seal means disposed between said first and second sealing surfaces for effecting a high pressure seal therebetween;

said first and second upset threads mating upon insertion of said plug section of said male connector section into said upset bore portion of said female connector section and rotation of said pair of tubular members with respect to each other whereby upon continued rotation of said tubular members said plug section first cylindrical portion mates with said interior bore of said one tubular member for effecting engagement of said elastomeric seal means therebetween and permitting continued axial rotational movement between said male and female connector sections for permitting said first upset threads to be displaced into said second thread relief groove and said second upset threads to be displaced into said first thread relief groove; and means for securing the tubular members together and preventing relative rotational movement therebetween.

2. The connection of claim 1 wherein the axial width of said elastomeric seal means is less than the sum of said first and second intervals.

3. The connection of claim 2 wherein said elastomeric seal means comprises at least one elastomeric O-ring disposed in an annular groove in at least one of said sealing surfaces.

4. The connection of claim 3 wherein said annular groove is disposed in said second sealing surface.

5. The connection of claim 4, wherein said first sealing surface comprises the interior bore of said one tubular member and said second sealing surface comprises the outer surface of said plug end first cylindrical portion.

6. The connection of claim 1 wherein said securing means comprises screws disposed in cooperating radial bores in said tubular members.

7. The connection of claim 1 wherein the diameter of said sealing surfaces and said elastomeric means is less than the diameter of the ridges of said first upset threads.

8. The connection of claim 1 wherein said first and second upset threads are straight threads.

9. The connection of claim 1 wherein said first and second upset threads are square threads.

10. The connection of claim 1, further including alignment and support means cooperating with said male and female connector sections to provide axial alignment and support therebetween after said first and second upset threads have rotated into said second and first thread relief grooves.

11. The connection of claim 10, wherein said alignment and support means comprises:

the portion of said female connector section having an increased upset bore adjacent the outer end thereof, and the portion of said male connector section plug end second cylindrical portion having a second diameter adjacent the tubular member body for engagingly mating with said female connector portion.

* * * * *